United States Patent

Miyazono

[11] Patent Number: 6,116,312
[45] Date of Patent: Sep. 12, 2000

[54] HEAVY DUTY PNEUMATIC RADIAL TIRES WITH SPECIFIED BEAD CORE BENDING RIGIDITY

[75] Inventor: Toshiya Miyazono, Kodaira, Japan

[73] Assignee: Bridgestone Corporation, Tokyo, Japan

[21] Appl. No.: 09/110,875

[22] Filed: Jul. 7, 1998

[30] Foreign Application Priority Data

Jul. 7, 1997 [JP] Japan ..................... 9-181125

[51] Int. Cl.⁷ ..................... B60C 15/04; B60C 15/06
[52] U.S. Cl. ..................... 152/540; 152/543; 152/547
[58] Field of Search ..................... 152/540, 543, 152/547; 245/1.5

[56] References Cited

U.S. PATENT DOCUMENTS 4,215,737   8/1980   Motomura et al. .
4,747,440   5/1988   Holmes et al. .
5,181,978   1/1993   Ochiai .

OTHER PUBLICATIONS

Patent Abstracts of Japan, vol. 98, No. 6, Apr. 30, 1998 & JP 10–053011A (Bridgestone Corp), Feb. 24, 1998.

*Primary Examiner*—Adrienne C. Johnstone
*Attorney, Agent, or Firm*—Sughrue, Mion, Zinn, Macpeak & Seas, PLLC

[57] ABSTRACT

A heavy duty pneumatic radial tire comprises a bead portion provided with a wire chafer having an outer end located outward over an outer end of a turnup portion of a carcass ply in a radial direction of the tire, in which a bead core embedded in the bead portion has a given bending rigidity and has an excellent cornering property without degrading a rim assembling operability.

10 Claims, 9 Drawing Sheets

FIG_1a

FIG_1b

FIG_4

FIG_5

FIG_6

FIG_7a

FIG_7b

FIG_8a

FIG_8b

FIG_9a

FIG_9b

FIG_10a

FIG_10b

FIG_11a

FIG_11b

HEAVY DUTY PNEUMATIC RADIAL TIRES WITH SPECIFIED BEAD CORE BENDING RIGIDITY

BACKGROUND OF THE INVENTION

1. Field of the Invention

This invention relates to a heavy duty pneumatic radial tire for use in truck, bus and the like comprising a bead portion provided with a wire chafer having an outer end positioned outward over an outer end of a turnup portion of a carcass ply in a radial direction of the tire. More particularly it relates to a heavy duty pneumatic radial tire effectively enhancing cornering power to improve a cornering property.

2. Description of Related Art

For example, the heavy duty pneumatic radial tire for use in truck, bus and the like generally has such a structure that a carcass ply is toroidally extended between a pair of bead cores and each end portion thereof is turned up around the bead core from inside toward outside. A tread portion is reinforced by plural belt layers and is superimposed about an outer periphery of a crown portion of the carcass ply. A wire chafer or the like for reinforcing the bead portion is arranged on an outer surface of a turnup portion of the carcass ply.

In case of the tire comprising the bead portion provided with the wire chafer, in order to prevent separation failure at the end of the turnup portion of the carcass ply, the wire chafer is arranged to cover the end of the turnup portion, or the wire chafer is frequently arranged so that the outer end of the wire chafer is located outward over the outer end of the turnup portion in the radial direction of the tire.

However, when the outer end of the wire chafer is arranged to locate outward from the outer end of the turnup portion in the radial direction of the tire, as a turnup length of the turnup portion of the carcass ply is relatively short, a length of a wire cord embedded in the turnup portion is apt to become shorter, so that the bending rigidity of the bead portion at in section thereof is not sufficiently obtained and the falling-down of the bead portion becomes larger during the running of the tire under loading and as a result, the cornering property tends to be degraded.

As means for enhancing the bending rigidity, it is useful to newly establish, for example, a wire chafer or a nylon chafer, or to use a stiffener having a high hardness or the like, but it is difficult to effectively enhance the bending rigidity by only these means.

SUMMARY OF THE INVENTION

The inventor has made studies for effectively enhancing the bending rigidity. Firstly, as a result of the detailed observations on the deformation state of the tire running under loading, it has been found that the bead core located just under the load tends to move inward in the rotating axial direction of the tire and such a movement of the bead core is cause of increasing the falling-down of the bead portion.

The inventor has made further studies under a conception that the falling-down of the bead portion can be made small by restraining the movement of the bead core, and found that the use of the bead core having an adequate bending rigidity can largely control the movement of the bead core and hence the falling quantity of the bead portion can considerably be decreased.

It is, therefore, an object of the invention to provide a heavy duty pneumatic radial tire having an excellent cornering property by using a bead core having an adequate bending rigidity in the tire comprising a bead portion provided with a wire chafer having an outer end positioned outward over an outer end of a turnup portion of a carcass ply in a radial direction of the tire.

According to the invention, there is the provision of a heavy duty pneumatic radial tire comprising a pair of bead cores, a carcass ply toroidally extending between the bead cores and turned up around each bead core from inside of the tire toward outside thereof to form a turnup portion, and a wire chafer arranged at least along an outer surface of each turnup portion to locate an outer end thereof outward from an outer end of the turnup portion in a radial direction of the tire. The bead core has a bending rigidity within a range of $0.10 \leq L/D \leq 0.27$ wherein L is a vertical displacement at a position when only a half portion of a circumferential length of the bead core is horizontally and fixedly laid on a table and a weight of 50 kg is suspended in a position dividing the remaining half portion of the circumferential length into two equal parts, and D is an inner diameter of the bead core.

Figure 1A:
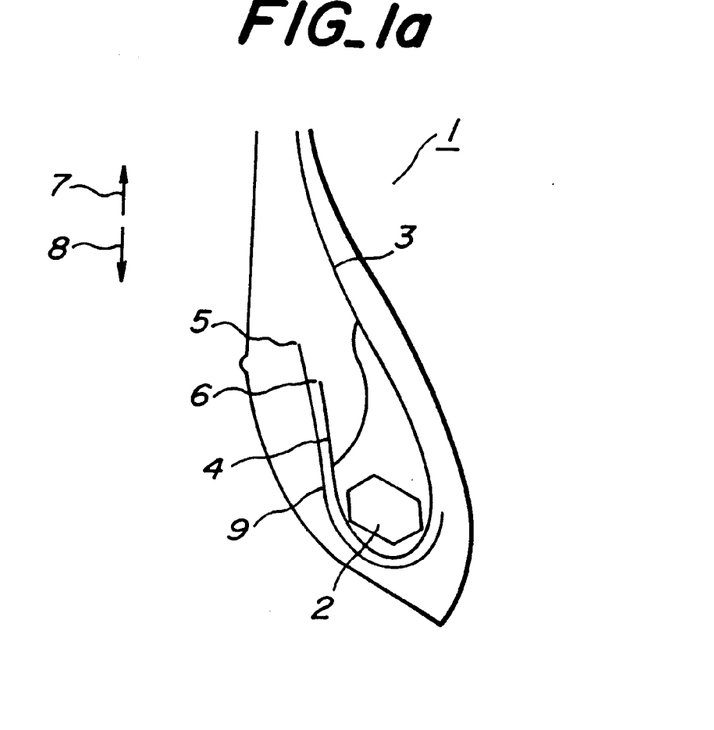
FIG. 1a is a diagrammatically section view of a typical bead portion in a first embodiment of the heavy duty pneumatic radial tire according to the invention.
Figure 1B:
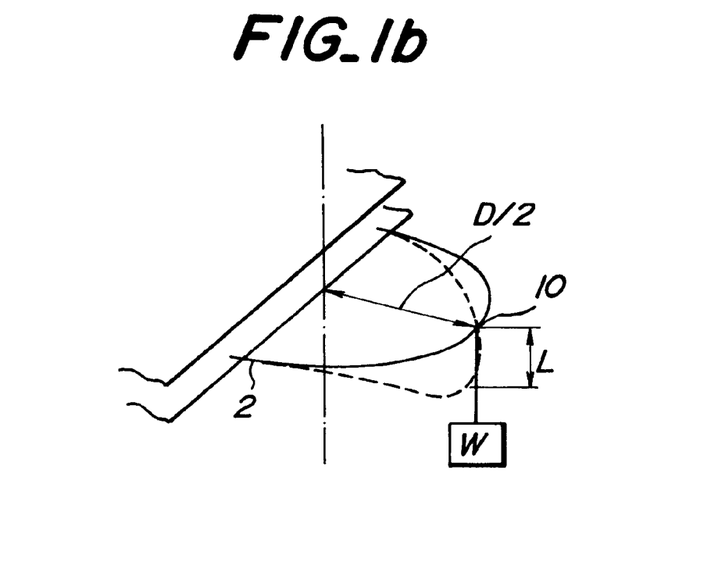
FIG. 1b is a schematic view illustrating a method for measuring L/D ratio of the bead core.
Figure 2:
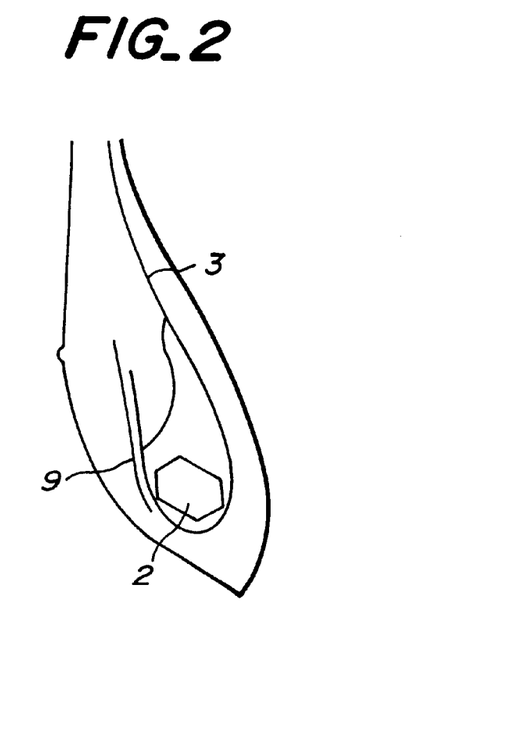
FIG. 2 is a diagrammatically section view of a second embodiment of the heavy duty pneumatic radial tire according to the invention.
Figure 3:
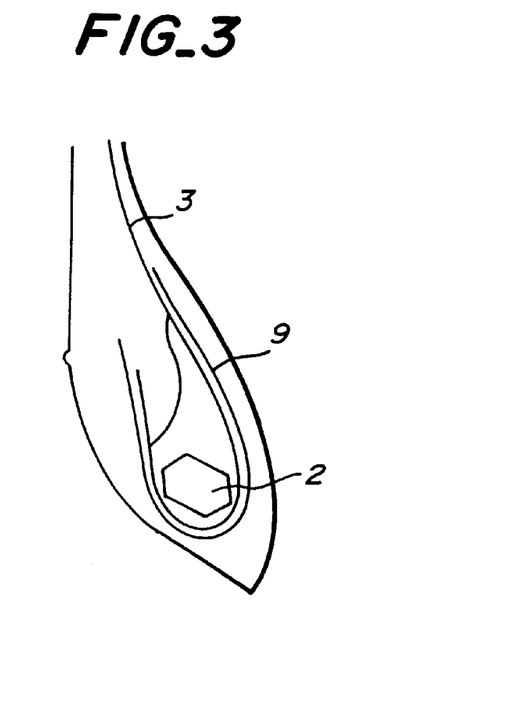
FIG. 3 is a diagrammatically section view of a third embodiment of the heavy duty pneumatic radial tire according to the invention.

The wording "the wire chafer is arranged at least along the outer surface of the turnup portion" means that the wire chafer covers the outer end of the turnup portion of the carcass ply and at least extends to an outer position of the bead core in the radial direction (as shown in FIG. 2), so that the wire chafer may be extended around the bead core from outside toward inside to a position reaching to the main body of the carcass ply (as shown in FIGS. 1 and 3).

In case of requiring to further improve the bead portion durability without sacrificing the effect of the invention, it is favorable that the wire chafer is comprised of two or more separate chafer segments.

Furthermore, in case of requiring to restrain the movement of the separate chafer segments to further enhance the rigidity in the circumferential direction of the tire, it is preferable that opposed ends of the adjacent separate chafer segments are arranged within a range of applying a fastening force of the bead core to a rim. Additionally, in case of requiring to mitigate stress concentration in the outer end of the separate chafer segment located outward from the outer end of the turnup portion of the carcass ply in the radial direction during the running of the tire under loading, it is preferable that the opposed ends of the adjacent separate chafer segments are arranged outward in the radial direction of the tire from the range of applying the fastening force of the bead core to the rim.

Moreover, the wording "range of applying the fastening force of the bead core to the rim" used herein means a range of contacting the tire with the rim under no load when the tire is assembled onto a standard rim disclosed in the following standards and inflated under an internal pressure, and concretely means a range from an inner end of the tire in the axial direction thereof in the contact with a rim base portion to an outer end of the tire in the radial direction thereof in the contact with a rim flange portion.

In this case, the term "an internal pressure" means air pressure corresponding to a maximum load (maximum load capacity) of a single wheel in an approved rim size disclosed in the following standards.

The term "standards" used herein is established by industrial standards which are effective every country of manufacturing or using tires, which are defined, for example, by "Year Book" published by The Tire and Rim Association Inc. in the United States of America, or by "Standards Manual" published by The European Tire and Rim Technical Organization in Europe, or by "JATMA Year Book" published by Japanese Automobile Tire Association in Japan.

Furthermore, in case of requiring to more enhance the rigidity of the tire in one rotating direction thereof, it is preferable that each of the separate chafer segments is a rubberized sheet containing a plurality of wire cords arranged side by side in one direction, and an inclining direction of the wire cord in the chafer segment is substantially the same between the adjacent separate chafer segments with respect to a radius line at a radial section of the tire.

On the other hand, in case of requiring to balancedly enhance the rigidity of the tire in both forward and backward rotating directions thereof, it is preferable that each of the separate chafer segments is a rubberized sheet containing a plurality of wire cords arranged side by side in one direction and inclining directions of the wire cords between the adjacent separate chafer segments are opposite to each other with respect to a radius line at a radial section of the tire.

In case of requiring to more mitigate stress concentration in the outer end of the wire chafer during the running of the tire under loading to restrain the occurrence of cracks from such an outer end, it is preferable that a 100% modulus of a coating rubber for the wire chafer is made smaller than that of a coating rubber for the carcass ply.

Moreover, in case of requiring to effectively delay a growing rate of cracks produced along the outer end of the wire chafer to more improve the durability, it is preferable to use a cord group in the wire chafer.

Moreover, in case of requiring to more improve the bead portion durability without sacrificing the effect of the invention, it is preferable to arrange one or more nylon chafers along the outer surface of the wire chafer.

In this case, each nylon chafer is a rubberized sheet containing a plurality of nylon cords arranged side by side in one direction and the wire chafer is a rubberized sheet containing a plurality of wire cords arranged side by side in one direction. Additionally, it is favorable that an inclining direction of a nylon cord in each nylon chafer is substantially the same as an inclining direction of a wire cord in the wire chafer with respect to a radius line at a radial section of the tire.

BRIEF DESCRIPTION OF THE DRAWINGS

The invention will be described with reference to the accompanying drawings, wherein.

DESCRIPTION OF PREFERRED EMBODIMENTS

In FIG. 1a diagrammatically illustrates a bead portion of a first embodiment of the heavy duty pneumatic radial tire according to this invention, in which numeral 1 is a bead portion, numeral 2 a bead core, numeral 3 a carcass ply, numeral 4 a turnup portion of the carcass ply, numeral 7 outside in the radial direction of the tire, and numeral 9 a wire chafer.

The tire having the bead portion 1 shown in FIG. 1a comprises a pair of bead cores 2, a tread portion (not shown) reinforced with a plurality of belt layers (not shown) disposed on an outer periphery of a crown portion of the carcass ply 3 toroidally extending between the bead cores 2 and turned up around the bead core from inside toward outside, and the wire chafer 9 arranged along an outer surface of the turnup portion 4 of the carcass ply 3 to locate an outer end 5 outward (7) from an outer end 6 of the turnup portion 4 in the radial direction of the tire.

In the tire comprising the bead portion 1 provided with the wire chafer 9 having the outer edge 5 located outward (7) from the outer end 6 of the turnup portion 4 in the radial direction of the tire, the invention lies in a point that the bending rigidity of the bead core 2 is rationalized to increase the cornering power, which is liable to be lacking in such a tire, or concretely lies in the use of a bead core having a bending rigidity within a range of $0.10 \leq L/D \leq 0.27$ wherein L is a vertical displacement at a position 10 when only a half portion of a circumferential length of the bead core before the assembling of tire members is horizontally and fixedly laid on a table and a weight W of 50 kg is suspended in the position 10 dividing the remaining half portion of the circumferential length into two equal parts, and D is an inner diameter of the bead core as shown in FIG. 1b.

Figure 6:
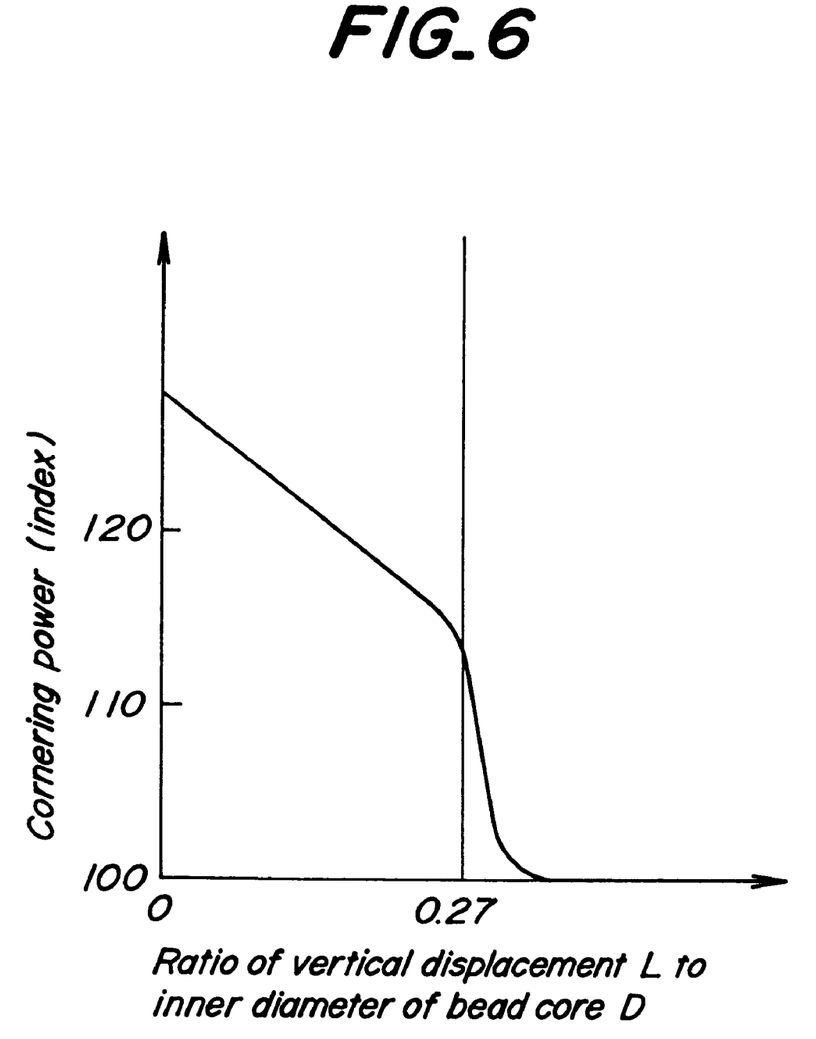
FIG. 6 is a graph showing a change of cornering power relative to L/D ratio.

FIG. 6 shows a relationship between L/D ratio and cornering power measured with respect to various trial tires manufactured by using bead cores having different L/D ratios as the bead core 2 in the heavy duty pneumatic radial tire having the bead portion shown in FIG. 1a.

As seen from FIG. 6, the cornering power suddenly lowers when the L/D ratio exceeds 0.27.

On the other hand, as a result of investigations on rim assembling operability, it has been found that the rim assembling operability is largely degraded when the L/D ratio is less than 0.10.

In the invention, therefore, the L/D ratio is restricted to a range of 0.10–0.27, whereby the cornering power can be effectively increased without degrading the rim assembling operability.

Figure 4:
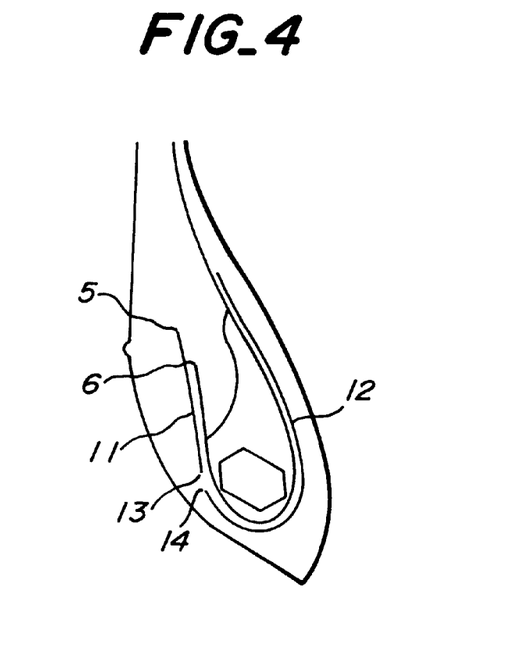
FIG. 4 is a diagrammatically section view of a fourth embodiment of the heavy duty pneumatic radial tire according to the invention.

In case of requiring to more improve the bead portion durability without sacrificing the effect of the invention, the wire chafer is preferable to be comprised of two or more separate chafer segments 11 and 12 as shown in FIG. 4.

Moreover, in case of requiring further enhancement of the rigidity in the circumferential direction of the tire while restraining the movement of the separate chafer segments, as shown in FIG. 4, it is favorable that the opposed ends 13, 14 of the adjacent separate chafer segments 11 and 12 are arranged within a range of applying a fastening force of the bead core 2 to a rim.

On the other hand, in case of requiring further mitigation of stress concentration in the outer end of the separate chafer segment located outward from the outer end of the turnup portion in the radial direction of the tire during the running of the tire under loading, it is preferable that the opposed ends 13, 14 of the adjacent separate chafer segments 11 and 12 are arranged outward (7) in the radial direction of the tire from the range of applying the fastening force of the bead core 2 to the rim to thereby facilitate the movement of the separate chafer segment 11 during the running of the tire under loading.

Figure 7A:
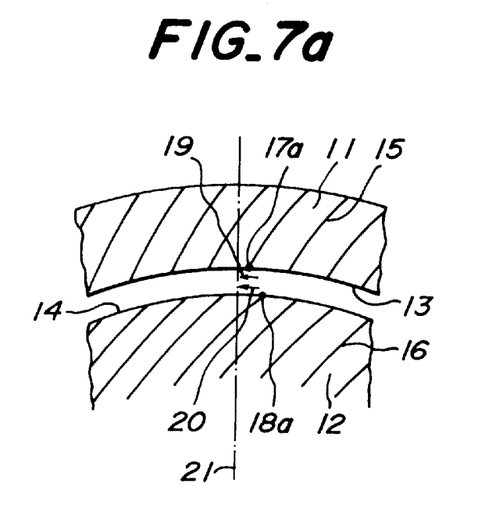
FIGS. 7a and 7b are diagrammatic views illustrating a first embodiment of the arrangement relationship between wire cords 15, 16 in adjacent separate chafer segments 11, 12.
Figure 7B:
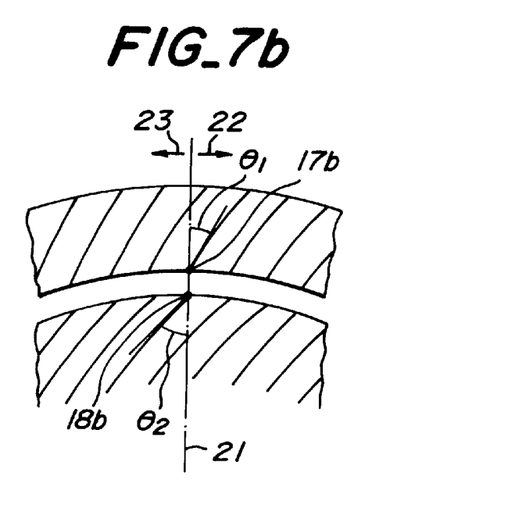

Additionally, as shown in FIGS. 7a and 7b, each of the separate chafer segments 11, 12 is a rubberized sheet containing a plurality of wire cords 15 or 16 arranged side by side in one direction. When an end position 17a or 18a of one wire cord (FIG. 7a) existing in the opposed ends 13, 14 of the adjacent separate chafer segments 11, 12 rotates on the same radial section 21 of the tire around a rotating axial line of the tire regarded as a center axis, the wire cords 15, 16 extending from end positions 17b, 18b (FIG. 7b) of the wire cord moved on the section 21 by arrows 19 or 20 are located on different surface sides 22 and 23 of the section 21 in the adjacent separate chafer segments 11, 12. Alternatively an inclining direction of the wire cord in the chafer segment is substantially the same between the adjacent separate chafer segments 11, 12 with respect to a radius line at radial section 21 of the tire, whereby the tire rigidity in one rotating direction of the tire can be further enhanced to improve torque performance in this direction.

Moreover, the tire of the above structure is particularly suitable for use in trucks running over a long distance under a condition that a ratio of conducting acceleration or forward running operation is fairly higher than a ratio of conducting a backward running or stop operation.

In addition, it is more preferable that each of cross angles $\theta_1$ and $\theta_2$ (measured at an acute angle side) between the section 21 and a tangent drawn from each of the wire cords 15 and 16 extending from the end positions 17b and 18b is within a range of 55–75°.

Figure 8A:
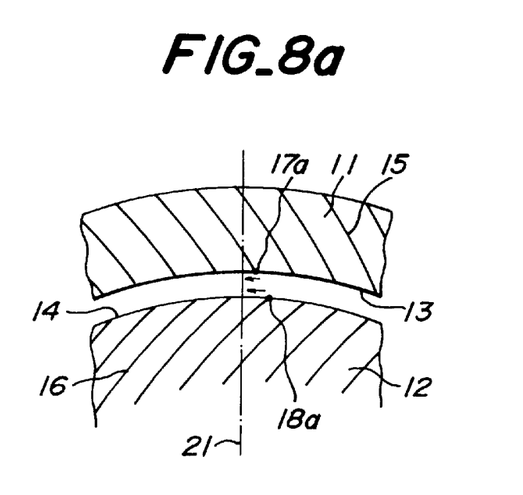
FIGS. 8a and 8b are diagrammatic views illustrating a second embodiment of the arrangement relationship between wire cords 15, 16 in adjacent separate chafer segments 11, 12.
Figure 8B:
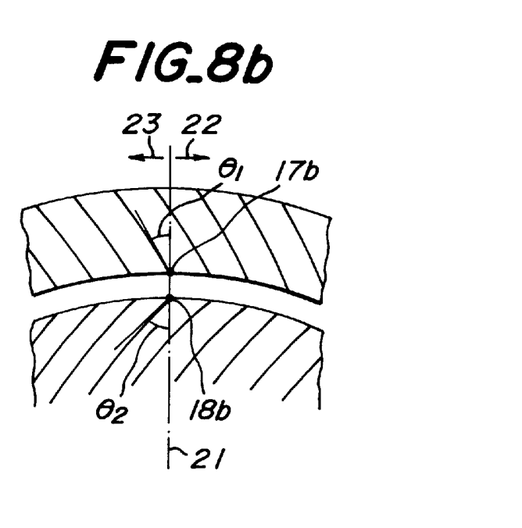

On the other hand, when the position relationship is opposite to that of FIGS. 7a and 7b as shown in FIGS. 8a and 8b, or when the wire cords 15, 16 extending from the end positions 17b, 18b rotated and moved on the section 21 (FIG. 8b) are located on the same surface side 23 of the section 21 in the adjacent separate chafer segments 11, 12, the tire rigidity in forward and backward running directions can balancedly be enhanced to enhance torque performance in both the directions of the tire.

Moreover, the tire of this structure is particularly suitable for use in bus or the like running under a condition that the ratio of conducting the backward running or stop operation and the ratio of conducting the acceleration or forward running operation are substantially the same.

In this case, it is further preferable that each of cross angles $\theta_1$ and $\theta_2$ (measured at an acute angle side) between the section 21 and a tangent drawn from each of the wire cords 15 and 16 extending from the end positions 17b and 18b is within a range of 55–75°.

In case of requiring to further mitigate stress concentration in the outer end 5 of the wire chafer 9 during running of the tire under loading to control the occurrence of cracks from the outer end 5, it is preferable that a 100% modulus of a coating rubber for the wire chafer 9 is made smaller than that of a coating rubber for the carcass ply 3. Concretely, it is preferable that a difference of the 100% modulus between both the coating rubbers is within a range of 0.6–0.9.

In case of requiring a further improvement the durability by delaying the growing rate of the crack produced along the outer end 5 of the wire chafer 9 as far as possible, it is preferable that a cord group 25 is used as the wire cord 15, 16 in the wire chafer 9.

Figure 10A:
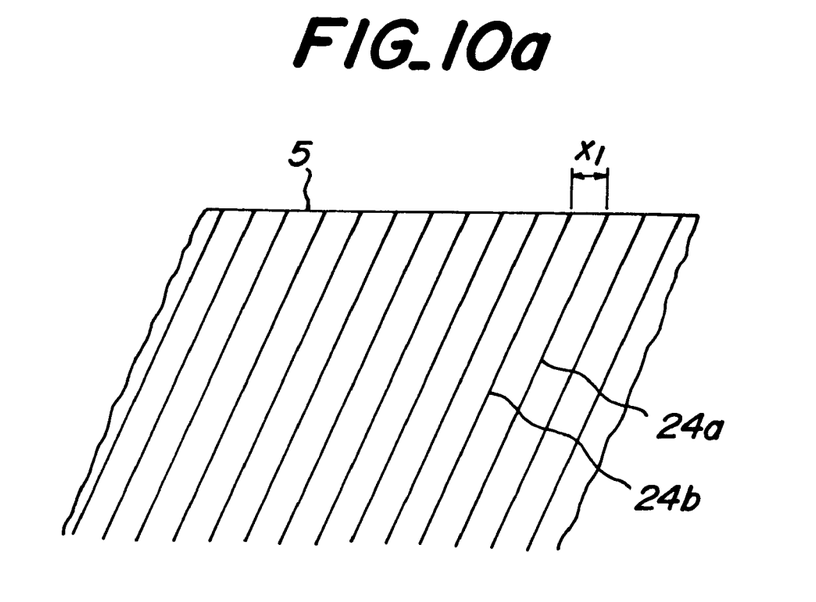
FIGS. 10a and 10b are diagrammatic views illustrating a growing state of cracks when a single wire cord 24 is used as the wire cords 15, 16 of the wire chafer 9.
Figure 10B:
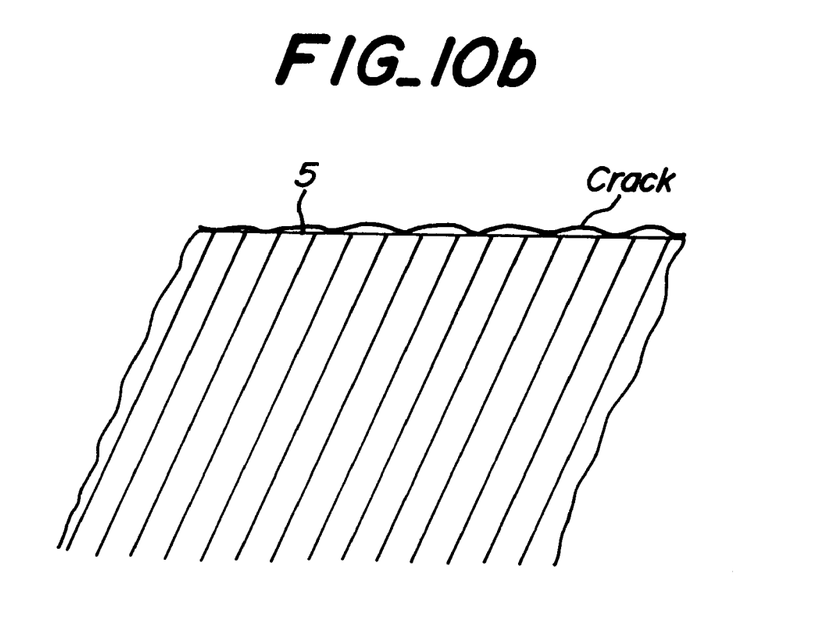

That is, when a single wire cord 24 is used as the wire cord 15, 16 in the wire chafer 9, as shown in FIG. 10a, a distance $x_1$ between the adjacent wire cords 24a and 24b is small, so that the crack generated in an end of a wire cord easily propagates to ends of the other wire cords adjacent thereto and finally the crack easily grows along the outer end 5 of the wire chafer 9 as shown in FIG. 10b to degrade the durability of the bead portion.

Figure 11A:
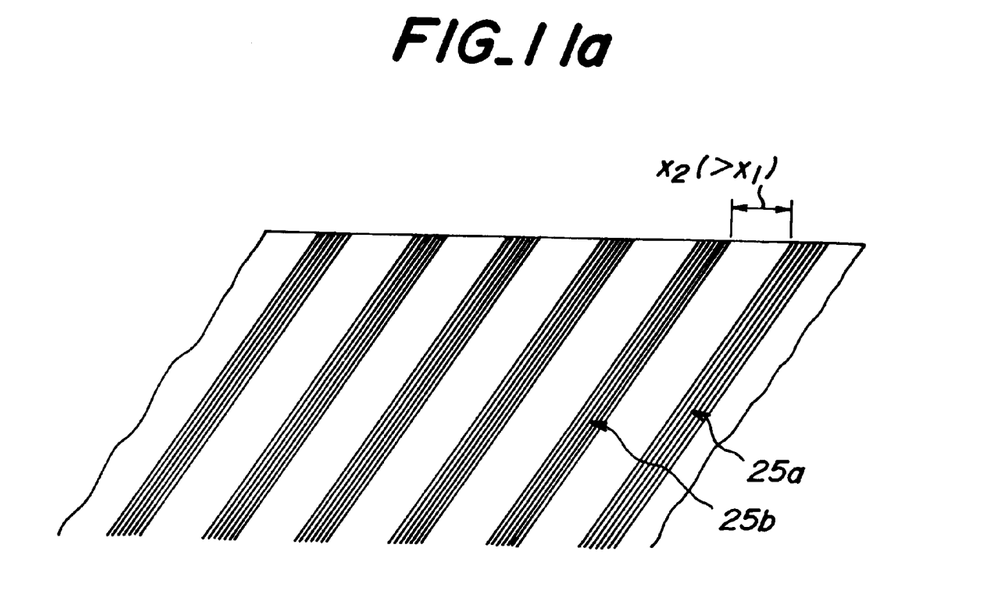
FIGS. 11a and 11b are diagrammatic views illustrating a growing state of cracks when a cord group 25 is used as the wire cord 15, 16 of the wire chafer 9.
Figure 11B:
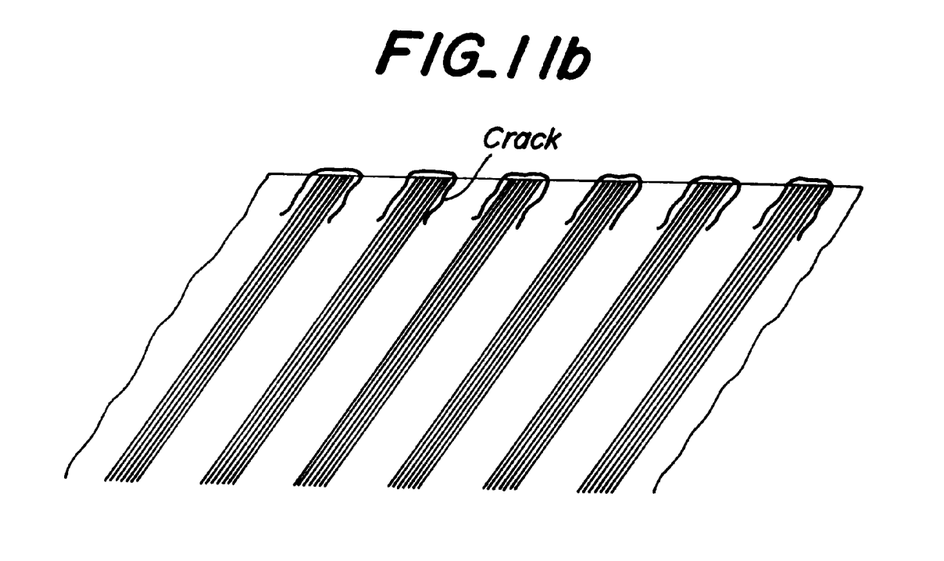

For this end, when a cord group 25 is used as the wire cord 15, 16 of the wire chafer 9 as shown in FIG. 11a, a distance $X_2$ between the adjacent cord groups 25a and 25b becomes large, so that the crack generated in an end of a cord group hardly propagates to the ends of the other cord groups adjacent thereto. As a result, the crack is liable to be easily grown along the cord group 25 as shown in FIG. 10b. Hence the crack hardly grows along the outer end 5 of the wire chafer 9 and the durability can be more improved.

Figure 5:
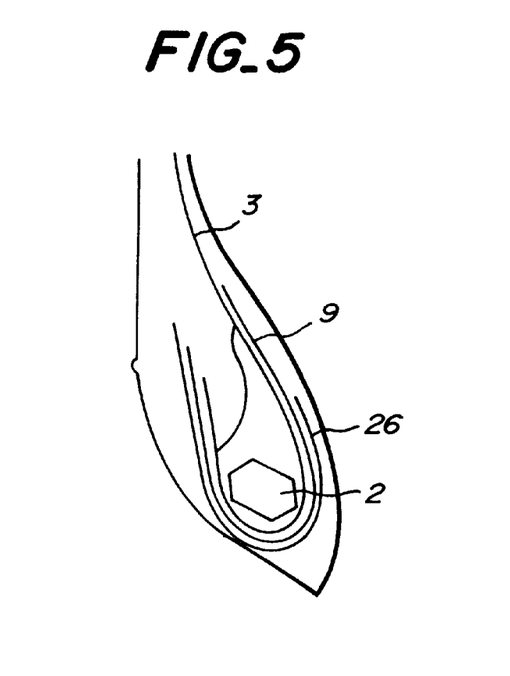
FIG. 5 is a diagrammatically section view of a fifth embodiment of the heavy duty pneumatic radial tire according to the invention.

As shown in FIG. 5, when one or more nylon chafers 26 are arranged along the outer surface of the wire chafer 9, bead portion durability can be more further improved without sacrificing the effect of the invention.

Figure 9A:
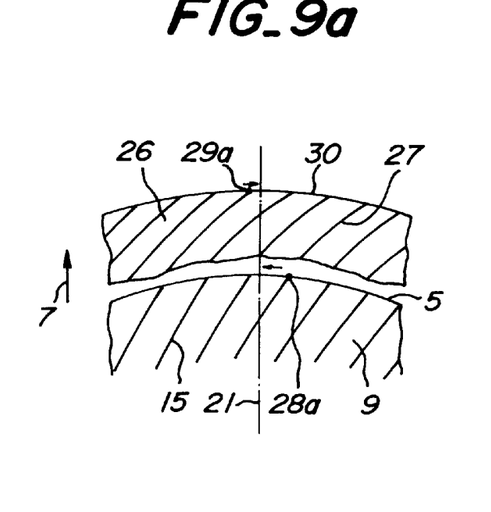
FIGS. 9a and 9b are diagrammatic views illustrating an embodiment of the arrangement relationship between wire cord 15 of a wire chafer 9 and a nylon cord 27 of a nylon chafer 26.
Figure 9B:
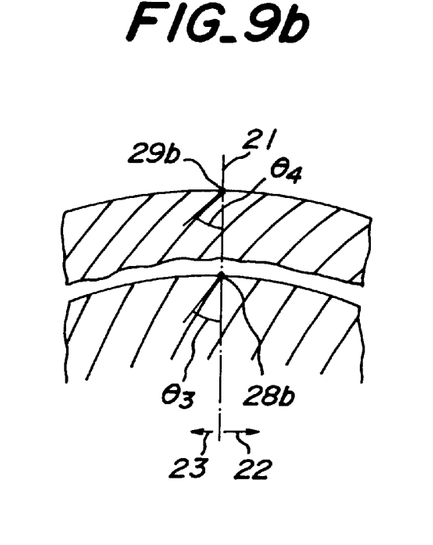

In FIGS. 9a and 9b are shown a relationship of arranging the wire cord 15 of the wire chafer 9 and the nylon cord 27 of the nylon chafer 26, in which a part of the nylon chafer 26 is cut away to see the outer end 5 of the wire chafer 9.

As shown in FIGS. 9a and 9b, the nylon chafer 26 is a rubberized sheet containing a plurality of nylon cords 27 arranged side by side in one direction and the wire chafer 9 is a rubberized sheet containing a plurality of wire cords 15 arranged side by side in one direction. In this case, an inclining direction of a nylon cord 27 in the nylon chafer 26 is substantially the same as an inclining direction of a wire cord 15 in the wire chafer 9 with respect to a radius line at a radial section of the tire. That is, when an end position 28a of one wire cord existing in the outer end 5 of the wire chafer 9 located outward (7) from the outer end 6 of the turnup portion of the carcass ply 3 in the radial direction and an end position 29a of one nylon cord existing in the outer end 30 of the nylon chafer 26 located outward (7) from the outer end 5 of the wire chafer 9 in the radial direction rotate on the same radial section 21 of the tire around a rotating axial line of the tire regarded as a center axis, the wire cords 15 and the nylon cord 27 extending from the end positions 28b, 29b of the wire cord and the nylon cord moved on the section 21 are located on the same surface side 23 of the section 21, whereby the stress concentration in the outer end 5 of the wire chafer 9 is mitigated and hence the bead portion durability can be more improved.

In this case, it is more preferable that cross angles $\theta_3$ and $\theta_4$ (measured at an acute angle side) between the section 21 and a tangent drawn from each of the wire cord 15 and the nylon cord 27 extending from the end positions 28b and 29b are within a range of 55–75° and a range of 35–55°, respectively.

Although the above has been described with reference to some embodiments of the invention, various modifications may be carried out within the scope of the invention.

The following examples are given in illustration of the invention and are not intended as limitations thereof.

EXAMPLE 1

A tire of this example is a tire having a bead portion as shown in FIG. 1a and a tire size of 11/70R22.5, in which a single wire chafer 9 is disposed over a zone ranging from a position located outward from an outer end 6 of a turnup portion 4 of a carcass ply 3 in the radial direction to a position somewhat exceeding a position located just beneath a bead core 2 and L/D ratio of the bead core is 0.25. Also, the carcass is a single carcass ply containing steel cords arranged side by side in the radial direction, and the belt is comprised of four rubberized steel cord layers in which cord angles of these layers with respect to an equatorial plane of the tire are R20°, R20°, L20°, L52° (R means upward to the right and L means upward to the left) viewed from the tread side, respectively. The other structure of this tire is the same as in the usual heavy duty pneumatic radial tire.

EXAMPLE 2

A tire of this example is the same as in Example 1 except that the L/D ratio of the bead core is 0.14.

EXAMPLE 3

A tire of this example is the same as in Example 1 except that the L/D ratio of the bead core is 0.12.

EXAMPLE 4

A tire of this example has a bead portion shown in FIG. 2, which is the same as in Example 2 except that a single wire chafer is disposed over a zone ranging from a position located outward from the outer end of the turnup portion in the radial direction to a position located somewhat before a position located just beneath the bead core.

EXAMPLE 5

A tire of this example has a bead portion shown in FIG. 3, which is the same as in Example 2 except that a single wire chafer is disposed over a zone ranging from a position located outward from the outer end of the turnup portion in the radial direction through a position just beneath the bead core to an inner surface side of the main body of the carcass ply.

EXAMPLE 6

A tire of this example has a bead portion shown in FIG. 4, which is the same as in Example 5 except that the wire chafer is comprised of two separate chafer segments and opposed ends of these separate chafer segments are arranged in a position of applying a fastening force of the bead core to a rim.

EXAMPLE 7

A tire of this example has a bead portion shown in FIG. 5, which is the same as in Example 5 except that a single nylon chafer is arranged on the outer surface of the wire chafer.

EXAMPLE 8

Figure 12:
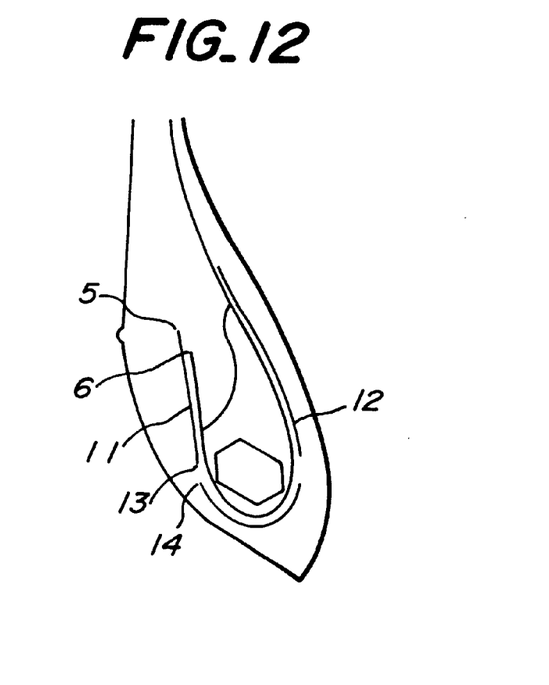
FIG. 12 is a diagrammatically section view of a sixth embodiment of the heavy duty pneumatic radial tire according to the invention.

A tire of this example has a bead portion shown in FIG. 12, which is the same as in Example 5 except that the wire chafer is comprised of three separate chafer segments.

EXAMPLE 9

Figure 13:
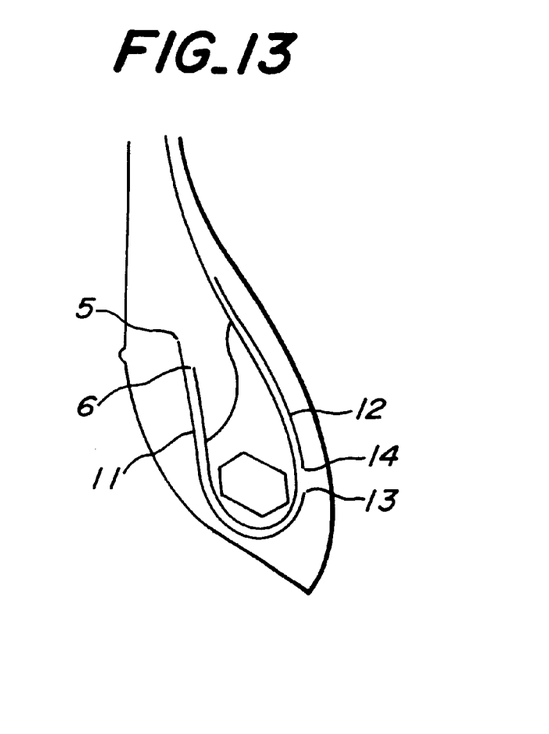
FIG. 13 is a diagrammatically section view of a seventh embodiment of the heavy duty pneumatic radial tire according to the invention.

A tire of this example has a bead portion shown in FIG. 13, which is the same as in Example 5 except that the wire chafer is comprised of two separate chafer segments.

COMPARATIVE EXAMPLE 1

A tire of this comparative example is the same as in Example 1 except that the L/D ratio of the bead core is 0.30.

COMPARATIVE EXAMPLE 2

A tire of this comparative example is the same as in Example 1 except that the L/D ratio of the bead core is 0.09.

Test Method

The cornering property, rim assembling operability and durability are evaluated with respect to the above tires.

The cornering property is evaluated by a value measured on a force in axle direction applied to the axis of the tire when the tire is assembled onto an approved rim (22.5×7.50) and run on a rotating drum of 1.7 m in diameter at a rotating speed corresponding to a speed of 60 km/h under conditions that an air pressure is 8.5 kgf/cm² and a load mass is 3000 kg with a slip angle of 7°. The results are shown in Table 1. Moreover, the numerical value of the cornering property in Table 1 is represented by an index on the basis that Comparative Example 1 is 100. The larger the index value, the better the cornering property.

The rim assembling operability is evaluated in three stages of "⊚", "○" and "X" by examining an easiness of rim assembling when the tire is assembled onto an approved rim (22.5×7.50), in which "⊚" means that the rim assembling is good, "○" means that the rim assembling is possible, and "X" means that the rim assembling is difficult. In the invention, marks "⊚" and "○" are acceptable level in the rim assembling operability. The results are also shown in Table 1.

The durability is evaluated by a measured value of a running distance until the occurrence of the separation in the bead portion when the tire is assembled onto an approved rim (22.5×7.50) and run on a rotating drum of 1.7 m in diameter at a rotating speed corresponding to a speed of 60 km/h under conditions that an air pressure is 8.5 kgf/cm² and a load mass is 5000 kg. The results are also shown in Table 1. Moreover, the numerical value of the durability is represented by an index on the basis that Comparative Example 1 is 100, in which the larger the index value, the better the durability.

TABLE 1

|  | Cornering property | Rim assembling operability | Durability |
| --- | --- | --- | --- |
| Comparative Example 1 | 100 | ⊚ | 100 |
| Comparative Example 2 | 130 | X | 100 |
| Example 1 | 115 | ⊚ | 100 |
| Example 2 | 123 | ○ | 100 |
| Example 3 | 125 | ○ | 100 |
| Example 4 | 122 | ○ | 105 |
| Example 5 | 125 | ○ | 107 |
| Example 6 | 124 | ○ | 110 |
| Example 7 | 126 | ○ | 115 |

TABLE 1-continued

|  | Cornering property | Rim assembling operability | Durability |
|---|---|---|---|
| Example 8 | 123 | ○ | 115 |
| Example 9 | 124 | ○ | 109 |

As seen from the results of Table 1, the cornering property in Examples 1–9 is excellent as compared with that of Comparative Example 1 and the rim assembling can be conducted by usual operation without troubles. Moreover, the durability is excellent in Examples 4–9 using the rationalized wire chafer and the nylon chafer.

On the other hand, Comparative Example 2 is good in the cornering property, but is difficult in the rim assembling by usual operation. If the rim assembling is forcibly conducted, the damage is observed in a toe zone of the bead portion.

As mentioned above, according to the invention, the cornering power, which is liable to be lacking in the heavy duty pneumatic radial tire for use in truck, bus and the like having a bead portion provided with the wire chafer having the outer end located outward from the outer end of the turnup portion in the radial direction, can be effectively enhanced without degrading the rim assembling operability, whereby it is possible to provide heavy duty pneumatic radial tires having an excellent cornering property.

What is claimed is:

1. A heavy duty pneumatic radial tire comprising a pair of bead cores, a carcass ply toroidally extending between the bead cores and turned up around each bead core from inside of the tire toward outside thereof to form a turnup portion, and a wire chafer arranged at least along an outer surface of each turnup portion so as to locate an outer end thereof outward from an outer end of the turnup portion in a radial direction of the tire, in which each bead core has a bending rigidity within a range of $0.10 \leq L/D \leq 0.27$ wherein L is a vertical displacement at a position when only a half portion of a circumferential length of the bead core is horizontally and fixedly laid on a table and a weight of 50 kg is suspended in a position dividing the remaining half portion of the circumferential length into two equal parts, and D is an inner diameter of the bead core.

2. A heavy duty pneumatic radial tire according to claim 1, wherein the wire chafer is comprised of two or more separate chafer segments.

3. A heavy duty pneumatic radial tire according to claim 2, wherein opposed ends of the adjacent separate chafer segments are arranged within a range of applying a fastening force of the bead core to a rim.

4. A heavy duty pneumatic radial tire according to claim 2, wherein opposed ends of the adjacent separate chafer segments are arranged outward in the radial direction of the tire from a range of applying a fastening force of the bead core to a rim.

5. A heavy duty pneumatic radial tire according to claim 2, wherein each of the separate chafer segments is a rubberized sheet containing a plurality of wire cords arranged side by side in one direction, and an inclining direction of the wire cord in the chafer segment is substantially the same between the adjacent separate chafer segments with respect to a radius line at a radial section of the tire.

6. A heavy duty pneumatic radial tire according to claim 2, wherein each of the separate chafer segments is a rubberized sheet containing a plurality of wire cords arranged side by side in one direction and inclining directions of the wire cords between the adjacent separate chafer segments are opposite to each other with respect to a radius line at a radial section of the tire.

7. A heavy duty pneumatic radial tire according to claim 1, wherein a 100% modulus of a coating rubber for the wire chafer is made smaller than that of a coating rubber for the carcass ply.

8. A heavy duty pneumatic radial tire according to claim 1, wherein the wire in the wire chafer is groups of wire cords.

9. A heavy duty pneumatic radial tire according to claim 1, wherein one or more nylon chafers are arranged along the outer surface of the wire chafer.

10. A heavy duty pneumatic radial tire according to claim 9, wherein each nylon chafer is a rubberized sheet containing a plurality of nylon cords arranged side by side in one direction and the wire chafer is a rubberized sheet containing a plurality of wire cords arranged side by side in one direction, and an inclining direction of a nylon cord in each nylon chafer is substantially the same as an inclining direction of a wire cord in the wire chafer with respect to a radius line at a radial section of the tire.

* * * * *